United States Patent [19]
Brown et al.

[11] 3,995,097
[45] Nov. 30, 1976

[54] PREVENTION OF FOULING IN POLYMERIZATION REACTORS

[75] Inventors: Terry D. Brown; Marion T. O'Shaughnessy, both of Bartlesville, Okla.

[73] Assignee: Phillips Petroleum Company, Bartlesville, Okla.

[22] Filed: Sept. 15, 1975

[21] Appl. No.: 613,665

[52] U.S. Cl. .................. 526/74; 526/106
[51] Int. Cl.² .................. C08F 2/14; C08F 4/24; C08F 10/00
[58] Field of Search .................. 526/64, 74, 106

[56] References Cited

UNITED STATES PATENTS

| | | | |
|---|---|---|---|
| 2,908,671 | 10/1959 | Hochgraf et al. | 260/93.7 |
| 3,013,868 | 12/1961 | Skei et al. | 44/62 |
| 3,074,924 | 1/1963 | Kizer et al. | 260/95 |
| 3,161,486 | 12/1964 | Rogers et al. | 44/51 |
| 3,248,179 | 4/1966 | Norwood | 23/285 |
| 3,330,818 | 7/1967 | Derby | 260/94.9 |
| 3,359,086 | 12/1967 | Marumo et al. | 44/63 |
| 3,919,185 | 11/1975 | Takebe et al. | 526/114 |

FOREIGN PATENTS OR APPLICATIONS

| | | |
|---|---|---|
| 2,302,962 | 7/1973 | Germany |
| 749,898 | 6/1956 | United Kingdom |

*Primary Examiner*—Alan Holler

[57] ABSTRACT

An olefin is polymerized in a hydrocarbon diluent in a turbulent reaction zone to produce particles of polymer which are substantially insoluble in the diluent. Fouling of the reactor by adherence of polymer particles to the walls of the reactor is reduced by adding to the reaction medium a composition which comprises a mixture of an aluminum or chromium salt of an alkyl salicylic acid and an alkali metal alkyl sulfosuccinate.

5 Claims, 1 Drawing Figure

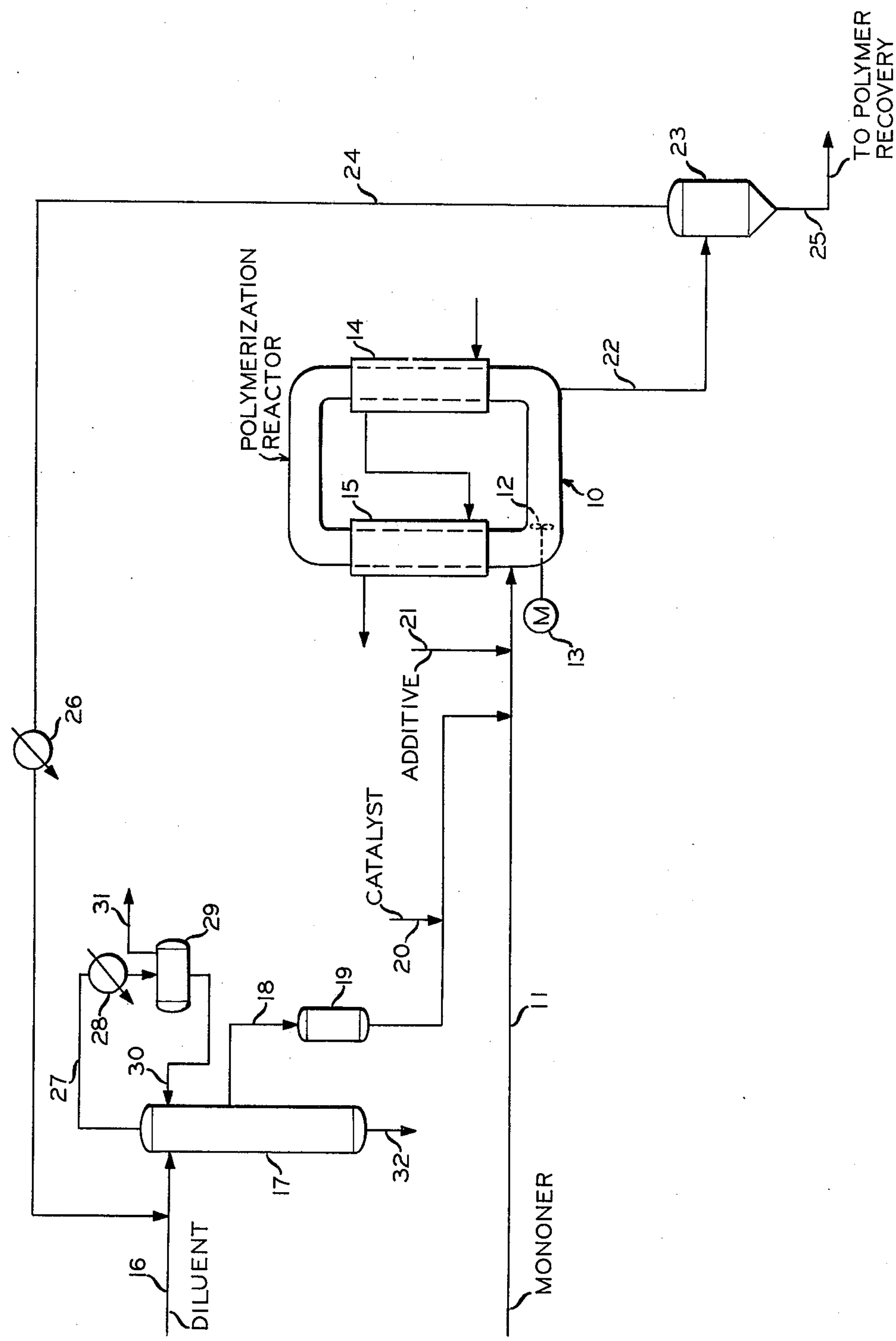
TO POLYMER RECOVERY
POLYMERIZATION REACTOR
ADDITIVE
CATALYST
DILUENT
MONONER
10
11
12
13
14
15
16
17
18
19
20
21
22
23
24
25
26
27
28
29
30
31
32

PREVENTION OF FOULING IN POLYMERIZATION REACTORS

It is well known that normally solid polymers of olefins can be prepared by polymerizing the olefins in a hydrocarbon diluent in a turbulent reaction zone. Such processes are frequently carried out in such a manner as to produce particles of polymer which are substantially insoluble in the diluent. These processes are often referred to as "particle-form" polymerization processes. Such processes are capable of producing polymers having high shear response, and have certain economic advantages because it is not necessary to recover polymer from a solvent. This inherently simplifies the polymer recovery procedure. However, it has been found that the polymer particles often tend to adhere to the reactor walls to reduce heat transfer. This adherence of polymer particles may result in the reactor becoming plugged.

In accordance with this invention, it has been found that the problem of reactor fouling in a polymerization process of the type described can be reduced or eliminated by addition to the reaction medium of a composition which comprises a mixture of an aluminum or chromium salt of an alkyl salicylic acid and an alkali metal alkyl sulfosuccinate. One specific example of such a mixture comprises aluminum salts of mono- and dihexadecylsalicylic acid and sodium dioctylsulfosuccinate.

The accompanying drawing is a schematic representation of polymerization apparatus in which the method of this invention is particularly useful.

With reference to the drawing, olefin monomer to be polymerized is introduced into a loop reactor 10 through an inlet conduit 11. This reactor, which can be of the type described in detail in U.S. Pat. No. 3,248,179, is provided with an impeller 12 which is rotated by a motor 13. Impeller 12 serves to direct the reaction medium in a confined path through the loop reactor. The reactor is provided with jackets 14 and 15 through which a coolant can be circulated to remove heat.

Fresh diluent is introduced into the system as required through a conduit 16 which communicates with a fractionation column 17. This diluent, which can be isobutane, for example, is removed through a side stream withdrawal conduit 18 which has a dryer 19 therein. The dried diluent is added to the monomer stream introduced into reactor 10. Catalyst is added through a conduit 20, and the additive of this invention is added through a conduit 21. Polymer is withdrawn from reactor 10 through a conduit 22 which communicates with a flash tank 23. Diluent and unreacted monomer are removed from the top of flash tank 23 through a conduit 24. Polymer is removed from the bottom of flash tank 23 through a conduit 25 and passed to suitable recovery equipment.

The stream withdrawn through conduit 24 is passed through a cooler 26 and introduced into fractionation column 17. An overhead stream is withdrawn from the top of column 17 through a conduit 27 which has a condenser 28 therein. The resulting condensate is delivered to an accumulator 29, and from there is returned to column 17 as reflux through a conduit 30. Any light gases are removed through a conduit 31. Any heavy materials present are withdrawn from the bottom of column 17 through a conduit 32.

The method of this invention is applicable to the polymerization of olefins in a particle-form process wherein polymer particles are produced which are substantially insoluble in the diluent in the reactor. The invention is particularly applicable to the production of solid homopolymers of ethylene and copolymers of ethylene with another 1-olefin containing 3 to 8 carbon atoms per molecule. Exemplary copolymers include those of ethylene/propylene, ethylene/1-butene, ethylene/1-hexene and the like. Such copolymers generally comprise about 95 to 99 mol percent ethylene. As is known in the art, these polymers are particularly suited for extrusion, blow molding, injection molding and similar applications.

The foregoing polymers can advantageously be formed by use of a catalyst comprising chromium oxide associated with at least one of silica, alumina, zirconia, or thoria. Such catalysts are well known in the art and are described in U.S. Pat. No. 2,825,721, for example, the disclosure of which is herein incorporated by reference.

The particle-form process to which this invention is applicable is a process in which at least one olefin is polymerized at a temperature in the range of about 150° to about 230° F. (65.6° to 110° C.). The catalyst is maintained in suspension and is contacted with the olefin feed in an organic diluent at pressure sufficient to maintain the medium and at least a portion of the olefin in the liquid phase. The reaction conditions are such that the polymer produced is substantially insoluble in the diluent and is recovered from the reactor in the form of solid particles. The diluent is generally a paraffin or a cycloparaffin having 3 to 12 carbon atoms per molecule. Representative examples of such diluents include propane, butane, isobutane, pentane, isopentane, cyclohexane, n-dodecane, methylcyclohexane, isooctane and the like. Pressures within the reaction zone can range from about 100 to 700 psig (6.8 to 47.6 atmospheres) or higher, and catalyst concentrations can range from about 0.001 to about 1 weight percent based on the weight of the reactor contents. Hydrogen can be added to modify the molecular weight of the polymers produced if desired. Processes of this type are disclosed in British Pat. No. 853,414, complete specification published Nov. 9, 1960, and in U.S. Pat. No. 3,644,323, the disclosures of which are herein incorporated by reference.

The reactor is one in which turbulence is imparted to the reaction medium. Reactors in the form of a loop in which the reaction medium is circulated are particularly useful. As previously mentioned, such a reactor is described in U.S. Pat. No. 3,248,179, the disclosure of which is herein incorporated by reference. However, other types of reactors, such as stirred reactors, can be employed.

In accordance with this inventon, a material is added to the polymerization reaction medium through conduit 21 to reduce or eliminate fouling. This material comprises a mixture of (1) an aluminum or chromium salt of an alkyl salicylic acid and (2) and alkali metal alkyl sulfosuccinate. The presently preferred material is a mixture of an aluminum salt of mono- and dihexadecylsalicylic acid and sodium dioctylsulfosuccinate. The salicylic acid can be mono- or dialkyl where the alkyl group contains 10 to 18 carbon atoms. The alkyl group of the sulfosuccinate can contain 8 to 18 carbon atoms. Mixtures of these materials can also be employed. The foregoing materials (1) and (2) should be employed in a molar ratio in the range of 10:1 to 1:10, with a ratio in the range of 3:1 to 1:3 being preferred. The mixture is generally employed in the reactor in the smallest amount that is effective to prevent fouling. This can be determined by routine tests. For most applications, the mixture can be employed in a concentration of about 0.1 to about 100 ppm by weight, with a preferred range being about 1 to 10 ppm, based on the reactor contents. It is desirable to dissolve the mixture in a hydrocarbon solvent, such as n-decane. Paraffins of 9 to 20 carbon atoms are the preferred solvents, although naphthenic solvents such as decalin are also satisfactory. Of course, mixtures of solvents can also be employed.

In one specific example of this invention, the aluminum salt of hexadecylsalicylic acid was prepared by adding to a 1,000 ml flask 15.26 grams of the mono- and dihexadecylsalicylic acid (average of 1.7 hexadecyl units per molecule) and 350 ml of n-decane, the latter having been dried over activated alumina. To this solution was added 3.18 grams of aluminum acetylacetonate. The flask was connected to a Dean-Stark apparatus and refluxed for four hours. The apparatus comprised an inverted U-shaped tube connected to the flask. Berl saddles were positioned in the leg extendng upwardly from the heated flask, and a water condenser was connected to the other leg. By-product acetylacetone boiled overhead and was condensed out. Its removal was detected by the boiling point of n-decane, which reaches a steady point of approximately 174° C.

After refluxing, 3.37 grams of Aerosol O.T. (a commercial form of sodium dioctylsulfosuccinate sold by American Cyanamid Company) was added. The resulting mixture was again refluxed until the overhead n-decane became clear, indicating that all water had been removed. The mixture was then reduced in volume by boiling off n-decane until approximately 50 ml of the mixture remained. A mixture prepared by this procedure was employed in three of the foregoing runs.

A homopolymer of ethylene of 5–6 HLMI (D 1238-70F, 190° C., 21,600 gram weight) was produced in particle form in a loop reactor having a 6-inch (15.24 cm) diameter and a capacity of about 23 gallons (0.087 $m^3$). The polymerization catalyst comprised chromium trioxide supported on a silica. Isobutane was employed as diluent. Typical reactor composition was about 4.5 parts ethylene, 28 parts polymer, and 67.5 parts diluent, by weight. The reactor was supplied with a cooling jacket to maintain a temperature in the range of 212°–213° F. (100°–101.6° C.). In the absence of the additive of this invention, the reactor ΔT (difference between the reactor bulk temperature and temperature of the coolant supplied to the cooling jacket) was 14.0° F. (7.8° C.). However, the ΔT started to increase in about 24 hours and the reactor became fouled in about 36 hours, which required terminating the run. Additional runs were carried out with 0.5 and 1.0 ppm (based on the reactor contents) of the foregoing mixture. In the first of these runs using the 0.5 ppm by weight concentration, the reactor ΔT decreased to 12.5° F. (6.9° C.). The productivity was 4300 pounds of polymer per pound of catalyst. In the second of these runs using the 1.0 ppm concentration, the reactor ΔT was also 12.5° F. (6.9° C.). The productivity was 5300 pounds of polymer per pound of catalyst. In all of these runs the solids concentration in the reactor was in the range of 27–28 weight percent. The reactor was operated successfully without fouling when the additive of this invention was employed.

In another run, a copolymer of ethylene and hexene-1 was made in the reactor at an operating temperature of 180° F. (82.2° C.). The corresponding reactor ΔT was 17° F. (9.4° C.), and the correspondng productivity was 2300 pounds of polymer per pound of catalyst. In this run, the additive was employed in a concentration of 2.0 ppm. In the absence of the additive, the polymerization could not be carried out without rapid fouling of the reactor.

The foregoing runs demonstrate the effectiveness of the additive of this invention.

While this invention has been described in conjunction with presently preferred embodiments, it obviously is not limited thereto.

What is claimed is:

1. In a process in which at least one olefin is polymerized in a hydrocarbon diluent in a turbulent reaction zone to produce particles of polymer which are substantially insoluble in the diluent; the method of reducing adherence of polymer particles to the walls of the reaction zone which comprises adding to the reaction medium a composition comprising (1) at least one aluminum or chromium salt of an alkyl salicylic acid and (2) at least one alkali metal alkyl sulfosuccinate.

2. The method of claim 1 wherein said composition is added to the reaction medium in the range of about 0.1 to 100 parts per million by weight.

3. The method of claim 1 wherein the alkyl group of salicylic acid contains 10 to 18 carbon atoms and the alkyl group of the sulfosuccinate contains 8 to 18 carbon atoms.

4. The method of claim 1 wherein (1) is aluminum salts of mono- and dihexadecylsalicylic acid and (2) is sodium dioctylsulfosuccinate.

5. The method of claim 1 wherein (1) and (2) are employed in a molar ratio of 10:1 to 1:10.

* * * * *